United States Patent [19]

Jakob

[11] 3,711,037
[45] Jan. 16, 1973

[54] DEAD ZONE MECHANISM FOR AND INERTIA LOCKING RETRACTOR

[75] Inventor: Hans Jakob, Sherman Oaks, Calif.

[73] Assignee: American Safety Equipment Corporation, Encino, Calif.

[22] Filed: April 5, 1971

[21] Appl. No.: 131,125

[52] U.S. Cl. ............................................. 242/107.4
[51] Int. Cl. ............................................. A62b 35/00
[58] Field of Search ............ 242/107 SB, 107.4, 107.5, 107.6, 242/107.7; 297/386, 388, 389; 280/150 SB

[56] References Cited

UNITED STATES PATENTS

| 3,450,368 | 6/1969 | Glauser et al. | 242/107.4 |
| 3,482,799 | 12/1969 | Wrighton et al. | 242/107.4 |
| 3,568,948 | 3/1971 | Burns | 242/107.4 |

*Primary Examiner*—Werner H. Schroeder
*Attorney*—Miketta, Glenny, Poms and Smith

[57] ABSTRACT

The dead zone mechanism has gearing means for moving a blocking means correspondingly between blocking and release positions in response to an initial extension of the belt to provide a dead zone wherein the inertia locking mechanism is blocked from locking although the belt is withdrawn at a rate of acceleration above a predetermined locking rate of acceleration. The preferred embodiment of the gearing means includes a shaft gear on the belt reel shaft, a gear set on an axle parallel with the shaft and having one gear meshing with the shaft gear and the other gear meshing with a disc gear on the blocking means, said shaft gear and the gear of the set which meshes therewith having different numbers of teeth whereby rotation of the shaft by extension of the belt rotates the blocking means correspondingly between positions. The alternative preferred embodiment of the gearing means has the disc gear mounted for rotation with the reel and has a stationary tooth associated with the frame for engaging the disc gear as it is rotated thereby to incrementally rotate the blocking means correspondingly between positions. A retainer means may be provided for preventing rotation of the disc gear except as a result of engagement with the tooth.

12 Claims, 10 Drawing Figures

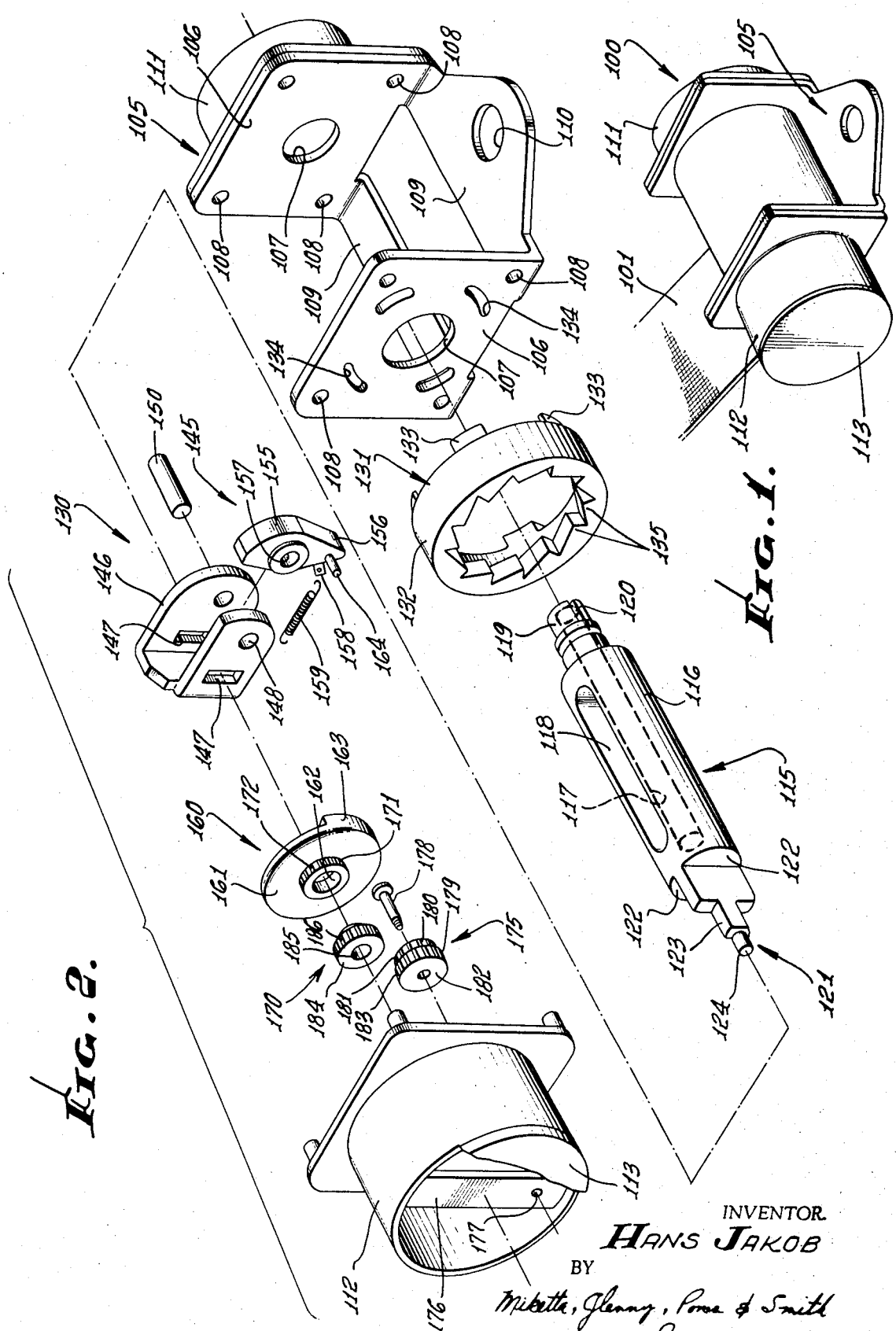

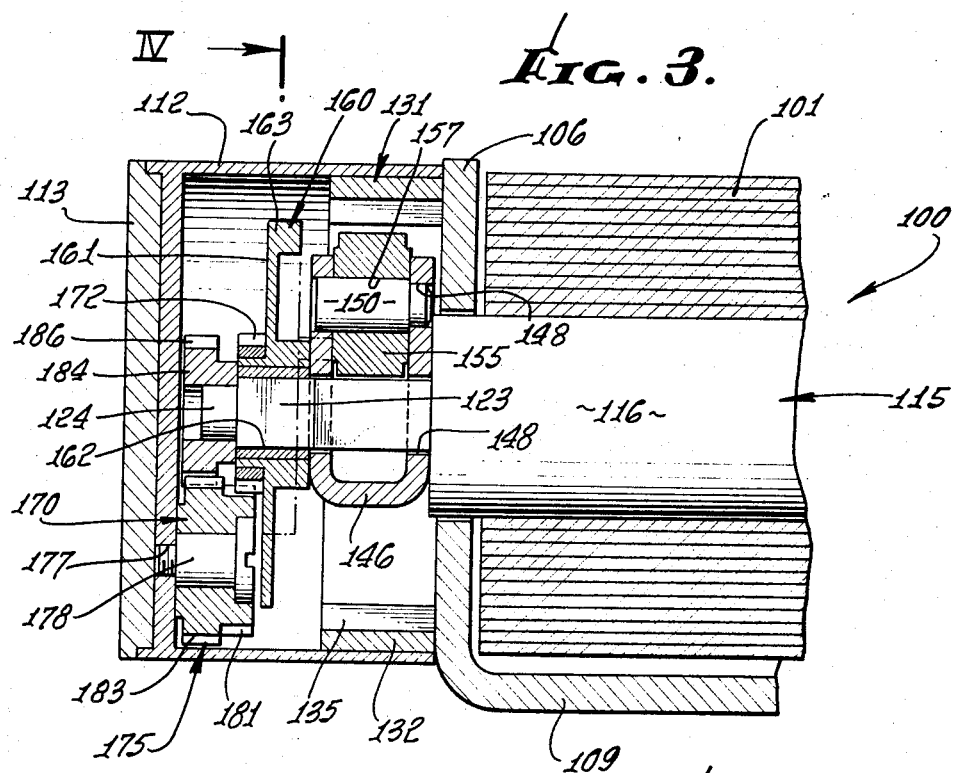
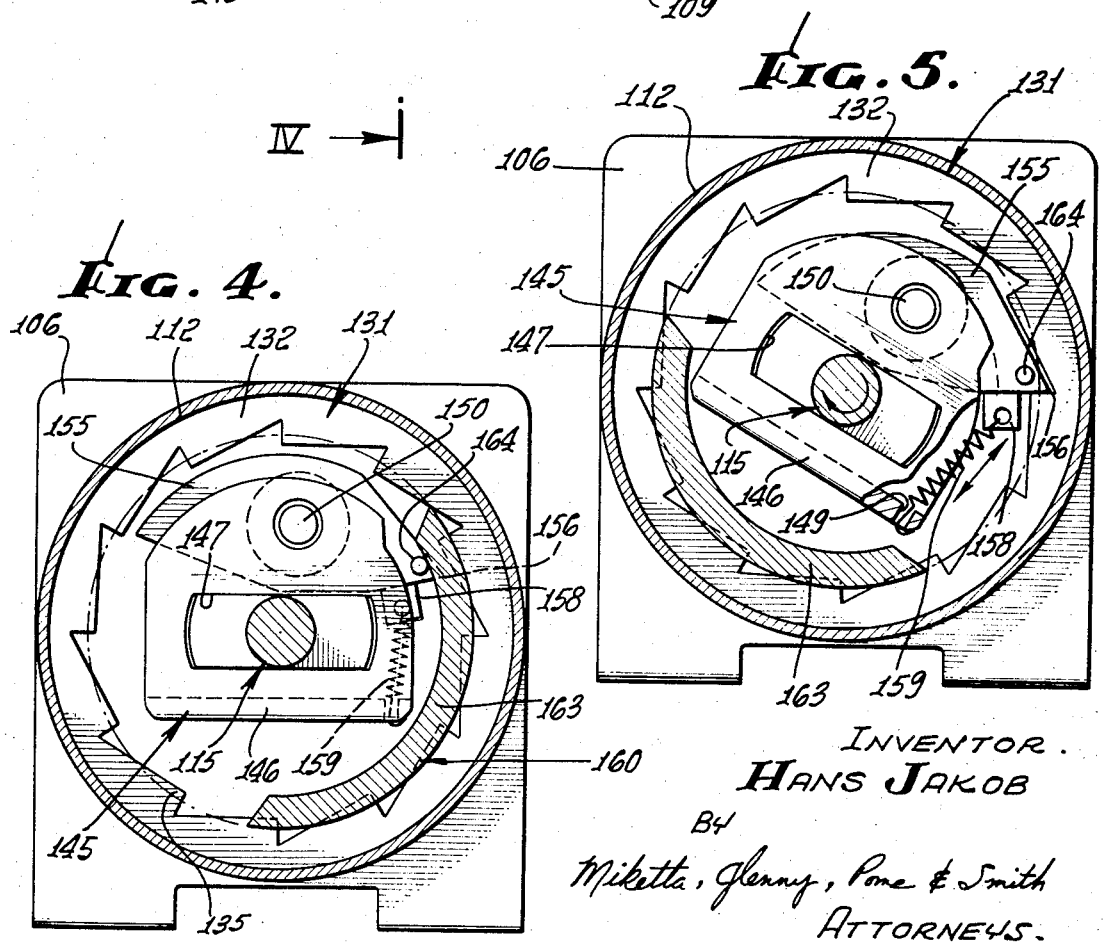

INVENTOR.
HANS JAKOB

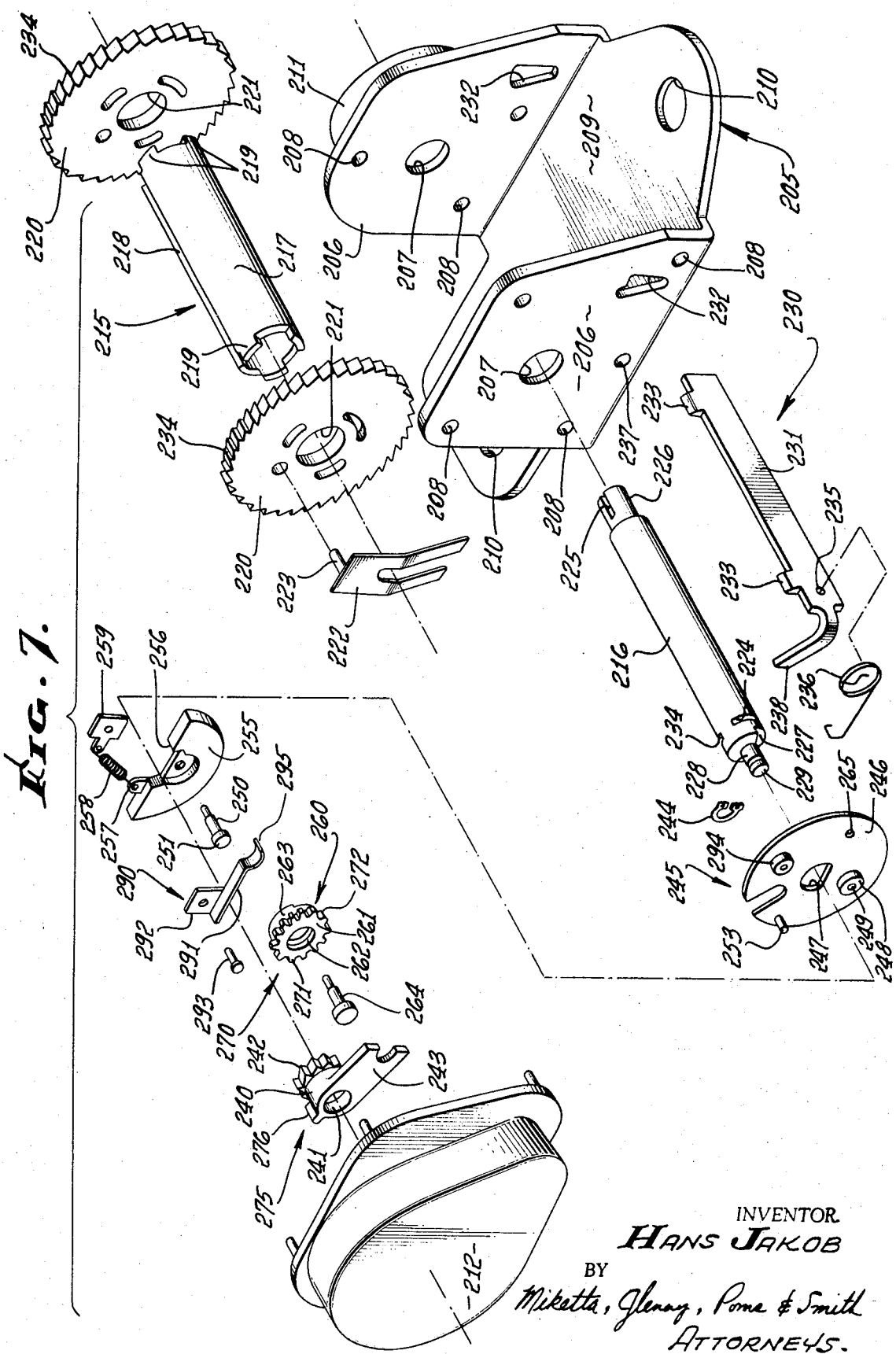

INVENTOR.
HANS JAKOB
BY
Miketta, Glenny, Poms & Smith
ATTORNEYS.

DEAD ZONE MECHANISM FOR AND INERTIA LOCKING RETRACTOR

BACKGROUND OF THE INVENTION

This invention relates to safety belt inertia locking retractors and more particularly to such retractors which have a dead zone mechanism for preventing the locking of the retractor during an initial extension of the belt.

Moving vehicles such as automobiles, aircraft, etc. are provided with safety harnesses, including seat belts, and possibly shoulder belts. Many times these belts are anchored to the vehicle by retractors which store these belts when not in use. One type of such retractor is an inertia locking retractor usually including a frame mounted to the vehicle structure, a reel rotatably mounted in the frame and windingly mounting a safety belt, a spring biasing the reel to a belt retracted position, and an inertia locking means for locking the reel against further rotation upon extension of the belt at a rate of acceleration above a predetermined locking rate of acceleration. Such inertia locking retractors are used because they permit extension and retraction of the belt to follow the movements of the wearer as long as such movements are slowly made. During such slowly made movements, the acceleration of the belt is not above the predetermined locking rate of acceleration. If the wearer moves suddenly, such as he would if the vehicle were in an accident, the belt is subjected to a rate of acceleration above the predetermined locking rate and the inertia locking means of the retractor locks the reel to prevent further extension of the belt and thereby restrain the wearer against movements which might injure him. A belt, anchored by an inertia locking retractor, is more apt to be worn because it allows movement of the wearer and so is less confining and yet still restrains the wearer when he needs to be restrained.

However, sudden movement of the belt often occurs when the belt is being withdrawn from the inertia locking retractor prior to being fastened about the wearer. Typically, a person reaches for the belt end protruding from the retractor and pulls it around him quickly. Because of the positioning of the retractor, a person can exert a strong force on the belt which withdraws the belt at a rate of acceleration above the predetermined locking rate of acceleration. Of course when the belt is so withdrawn, the inertia locking means of the retractor operates to lock the retractor and to halt the movement of the belt, usually before the belt has been withdrawn sufficiently to be fastened about the person. The person must then allow the belt to retract slightly before pulling the belt slowly from the retractor to withdraw a length of belt which is sufficient for fastening about him. Such locking of the retractor during the initial extension of the belt is undesirable and a nuisance which discourages the use of safety belts, even though the belts being anchored to the vehicle by inertia locking retractors are less confining once fastened.

There is no reason why the belt retractor should be able to lock until the belt has been initially extended and secured around the wearer. Therefore blocking means have been added to the inertia locking retractor for blocking the inertia locking means from locking until an initial extension of the belt has occurred. Examples of inertia locking retractors having such a blocking mechanism are shown in U.S. Pat. Nos. to J. E. Glauser et al. 3,450,368, and R. J. Wrighton 3,482,799.

In the inertia locking retractors shown in these patents, means are provided to move the blocking means between blocking and release positions corresponding to the extensive position of the belt. In Glauser, this means includes a threaded stud mounted to the frame cover, a nut threaded to the stud and rotated by pins projecting from the reel spindle to move the nut longitudinally, and thereby move a boss on the nut between a blocking position to block the inertia locking means and a release position. In Wrighton, this means includes a spiral groove in an end cap, a slide member on the reel shaft with a projection in the spiral groove, and having a shoulder for blocking the inertia locking means until the reel has rotated sufficiently to move the slide member and the shoulder thereof away from the inertia locking means. Applicant, in this invention, has discovered a new and novel means for moving the blocking means in response to movement of the belt which provides advantages in dependability, cost, ease of assembly, adaptability, etc. over these prior art devices.

BRIEF DESCRIPTION OF THE INVENTION

Therefore, it is the primary object of this invention to provide a novel means for operating the blocking means of an inertia locking retractor to provide a dead zone in which the locking means is blocked from locking by the blocking means while the belt is being initially extended.

Other and additional objects of this invention are to provide such a means which utilize gears to positively move the blocking means between blocking and release positions; to provide such a gearing means which is rotated by the rotation of the reel shaft to move the blocking means and thereby maintain correspondence between the belt position and the blocking means position; to provide such a gearing means which is adaptable for use with many different retractors; and to provide such a gearing means which is inexpensive to manufacture, easy to assemble in proper relationship to the belt position, compact in appearance once assembled, and dependable in operating to withstand many cycles of extension and retraction as well as many cycles of locking without failing or malfunctioning.

The improvement, according to this invention, in an inertia locking retractor having an associated dead zone mechanism includes the provision of gearing means associated with the safety belt reel and the blocking means of the retractor for moving the blocking means correspondingly between a blocking position to block the inertia locking means and a release position in response to an initial extension of the belt. The gearing means may have a disc gear or a disc having a limit shoulder for blocking the inertia locking means in certain rotative positions thereof and gear rotating means for rotating the disc gear in response to movement of the belt. The gearing means may include a shaft gear on the belt reel shaft, a gear set rotatably mounted to the retractor frame with one gear thereof driven by the shaft gear and the other gear thereof driving the disc gear, with one of the meshing gear combinations having unequal numbers of teeth to rotate the disc relative to the inertia locking means. The gear means may include a tooth associated with the frame for engagement by the disc gear as it rotates there past, on the disc carried by the rotating reel, to rotate the disc relative the inertia locking means. Retainer means such as a spring may be provided for retaining the gearing means relative the blocking means except when rotated by the gearing rotating means.

BRIEF DESCRIPTION OF THE DRAWINGS:

FIG. 1 is a perspective view of an inertia locking retractor for a safety belt, having the preferred embodiment of the improved dead zone mechanism according to this invention;

FIG. 2 is an enlarged, partially exploded perspective view of the retractor of FIG. 1;

FIG. 3 is a fragmentary side elevational view of the left end of the retractor of FIG. 1;

FIG. 4 is an end elevational view taken along the stepped plane IV—IV of FIG. 3 showing the limit shoulder of the blocking means over the pin from the pawl to block the locking movement of the pawl of the inertia locking means;

FIG. 5 is a view similar to FIG. 4 but showing the limit shoulder of the blocking means rotated away from the pin to release the pawl for locking and showing the pawl locking the reel of the retractor against extensive rotation;

FIG. 7 is an enlarged partially exploded perspective view of the retractor of FIG. 6;

Figure 8:
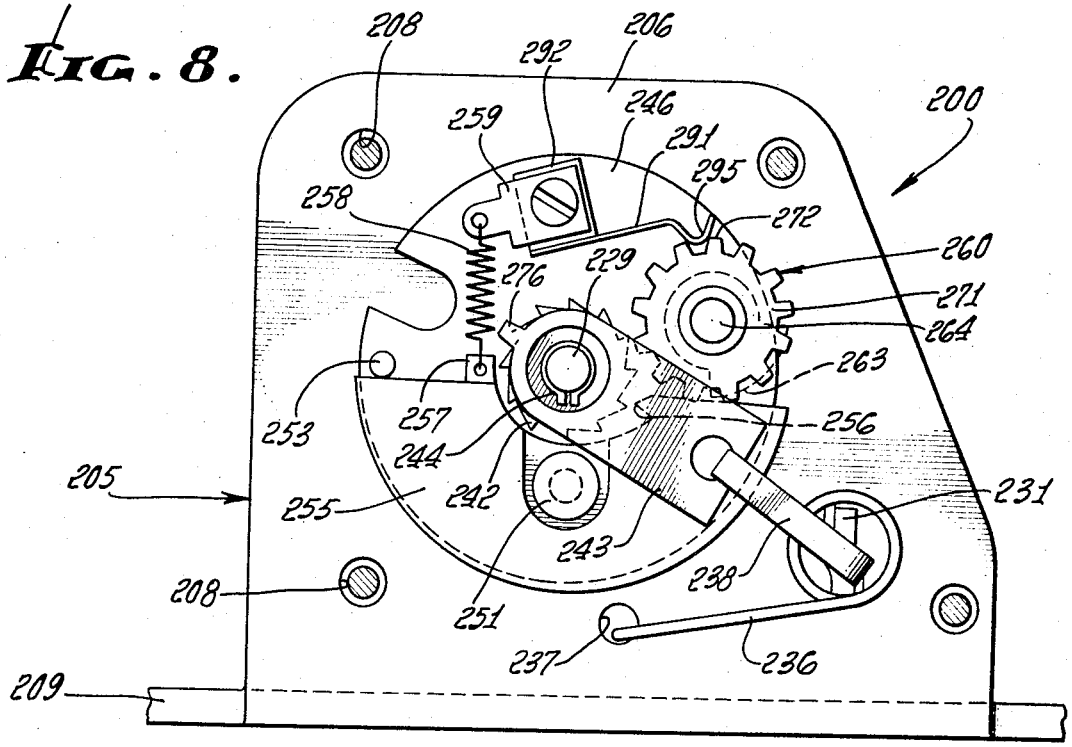
FIG. 8 is an enlarged end elevational view of the retractor of FIG. 6 with the end cap thereof removed, and showing the disc of the blocking means with the limit shoulder thereof engaging the pawl to block the inertia locking means from locking.

DETAILED DESCRIPTION OF THE PREFERRED EMBODIMENTS:

Referring now to the drawings, and particularly to FIGS. 1 through 5, an inertia locking retractor is generally denoted by the number 100. In FIGS. 6 through 10, the inertia locking retractor is generally denoted by the number 200. Both inertia locking retractors 100, 200 are for mounting a safety belt 101, 201, to a vehicle body (not shown) for retraction into the retractor 100, 200 to be stored and for extension from the retractor to be used.

While both of the retractors 100, 200 are inertia locking retractors, the particular mechanisms used to accomplish the inertia locking in each of the retractors 100, 200 is slightly different and the improvement, according to this invention, in the dead zone mechanism is also slightly different, but related. Therefore, a separate description of each retractor 100 and 200 is necessary. To show the broad relationship between basic divisions of the two retractors 100 and 200, these basic divisions will have numbers separated by 100. Unfortunately, the differences in the detailed parts of each basic division prevents this correspondence from being continued for the numbers of all the individual parts of the two retractors 100 and 200.

Generally, the retractors 100, 200 include a frame 105, 205; a belt reel 115, 215, mounting the safety belt 101, 201 in the frame 105, 205; an inertia locking means 130, 230 for locking the reel 115, 215 against further rotation upon application of a rate of acceleration to the belt 101, 201 which is above a predetermined lock actuating rate of acceleration; and blocking means 160, 260 for selectively holding the inertia locking means 130, 230 in the unlocked position. The improvement according to this invention includes the provision of gearing means 170, 270 associated with the reel 115, 215 and the blocking means 160, 260 for moving the blocking means 160, 260 correspondingly between blocking and release positions in response to extension of the belt 101, 201 relative the reel 115, 215 to provide a dead zone for the retractors 100, 200. The improvement may also include retainer means 290 for retaining the gearing means 270 in one rotative position until positively rotated to another position.

Referring now generally to FIGS. 1 through 5 and particularly to FIG. 2 the retractor 100 has a frame 105. The frame 105 has a spaced pair of upstanding side walls 106, each having therethrough an aligned central hole 107 and four peripheral mounting holes 108. The side walls 106 are interconnected by a two-part web 109 extending between the lower edges of the side walls 106. The rear web 109 has a triangular protrusion with a hole 110 suitable for mounting the frame 105 to a vehicle body (not shown) by bolts (not shown) as is conventional.

The frame 105 also has a right spring housing 111 on the right side wall 106 which is secured thereto by tabs extending through the peripheral mounting holes 108. The right spring housing 111 conventionally contains a spiral spring which provides the biasing means for rotating the reel 115 counterclockwise to the retracted position to wind the belt 101 therearound. Extension of the belt 101 then rotates the reel 115 clockwise against the action of this biasing means to unwind the belt 101 from the reel 115.

The frame 105 also has a left housing 112 which encloses the inertia locking means 130, the blocking means 160 and the gearing means 170. The left housing 112 has a cover 113 which will provide access to the means enclosed by the housing 112 as will be explained later. The housing 112 is secured on the left side wall 106 by tabs extending through the peripheral holes 108.

The reel 115, of the retractor 100, for having one end of the safety belt 101 secured thereto includes a shaft 116 through the aligned holes 107 of the frame 105. The central portion of the shaft 116 has a central bore 117 opening to the right end, and a slot 118 therethrough to the bore 117 to facilitate the mounting of the one end of the safety belt 101 thereto. The looped end of the safety belt 101 is inserted into the slot 118 and a pin (not shown) is inserted into the central bore 117 and into the looped end of the belt 101 to secure the belt 101 to the shaft 116.

The right end 119 of the shaft 116 protrudes from the right upstanding side wall 106 into the right spring housing 111. The right end 119 is provided with an end slot 120 which receives the inner end of the retractor spring in the right housing 111 to bias the shaft 116 counterclockwise to the retracted position, as has been previously explained.

The left end 121 of the shaft 116 protrudes from the left upstanding side wall 106 into the left housing 112. The left end 121 is provided with a pair of side cutouts 122 and diameter reductions causing several steps 123 which terminate in a stub shaft 124. The left end 121 of the shaft 116 is so shaped to receive individual parts of the inertia locking means 130, blocking means 160 and gearing means 170 which will be described later.

The inertia locking means 130 of the retractor 100 include the provisions of an internally toothed ratchet 131 on the frame 105 and pawl means 145 on the reel 115 for lockingly engaging the ratchet 131 upon the application of a rate of acceleration to the belt 101 which is above a predetermined lock actuating rate of acceleration. The pawl means 145 is moved from an unlocked position shown in FIG. 4 to a locked position shown in FIG. 5 by the application of such a rate of acceleration thereto.

The internally toothed ratchet 131 of the inertia locking means 130 includes a cylinder 132 with an outside diameter, sized to fit within the left housing 112. The cylinder 132 has tabs 133 on the right end thereof which extend into slots 134 in the left upstanding side wall 106 to secure the cylinder 132 to the frame 105. The ratchet 131 has internal teeth 135 into which the pawl means 145 locks.

The pawl means 145 include a U-shaped cross-section pawl mounting channel 146. The channel 146 is provided with aligned slots 147 into which the left end 121 of the shaft 116 is received to non-rotatably mount the channel 146 thereto for rotation therewith. The channel 146 when on the left end 121 of the shaft 116 is located within the ratchet 131. Outwardly of the slots 147 toward the free ends, the channel 146 is provided with aligned holes 148 sized to receive pawl pivot pin 150 therethrough. The web of the channel 146 is provided with a hole 149 for a purpose which will appear later.

The pawl means 145 also include provision of a pawl 155 for pivotally mounting in the channel 146 by the pin 150. The pawl 155 has a pointed end 156, a centrally located hole 157 for pivotally receiving the pin 150 therethrough, and an apertured spring tab 158 for seating one end of a spring 159. The other end of spring 159 is seated in the hole 149 in the channel 146 to bias the pawl 155 clockwise.

The pawl 155 is suitably shaped so that its inertia will tend to keep the pawl in its position while the channel 146 is rotated away therefrom to effectively pivot the pawl 155 counterclockwise about the pin 150, from an unlocked position to a locked position in which the pointed end 156 extends outwardly. The pawl 155 is balanced radially about its pivot axis to prevent centrifugal force, due to its being rotated, from pivoting the pawl 155 when it is not being accelerated. The spring 159 keeps the pointed end 156 following the rotating channel 146 and prevents the pawl 155 from pivoting on the pin 150 until rotated with sufficient acceleration. Additionally, the spring 159 returns the pawl 155, so pivoted, clockwise to the unlocked position when the acceleration ceases.

Upon rotation of the shaft 116 due to extension of the belt 101, with sufficient acceleration, i.e. at a rate of acceleration above a predetermined locking rate of acceleration, the pawl 155, due to the angular acceleration applied thereto, will be effectively pivoted outwardly from the unlocked position to the locked position wherein the pointed end 156 thereof engages a tooth 135 of the ratchet 131 to halt the rotation of the reel 115 and the extension of the belt 101. Upon release of the belt 101, the retractor spring rotates the shaft 116 counterclockwise to cam the pointed end 156 of the pawl 155 away from the tooth 135, permitting the spring 159 to return the pawl 155 to the unlocked position. Such locking action would occur during the initial extension of the belt 101 from the retractor 100, except that blocking means 160 are provided.

The blocking means 160 of the retractor 100 are for selectively holding the locking means 130 in the unlocked position while the belt 101 is being initially withdrawn from the retracted position. The blocking means 160 of the retractor 100 includes a disc 161 having a central bore 162 of a diameter to rotatably mount on the last step 123 of the left end 121 of the shaft 116. On the inner surface of the disc 161 adjacent the periphery thereof is an axially protruding arcuate limit shoulder 163. The limit shoulder 163 extends over approximately 120° of arc on the disc 161 for a purpose which will appear later. The blocking means 160 also includes a pin 164 extending axially towards the disc 161 from the side of pawl 155. The pin 164 is radially located on the pawl 155 so as to be located radially inwardly of the limit shoulder 163 when the pawl 155 is in the unlocked position as shown in FIG. 4. As best seen in FIGS. 4 and 5, the limit shoulder 163 on the disc 161 in certain rotative positions extends over the pin 164 to block outward pivoting of the pawl 155 and in other rotative positions is spaced away from the pin 164 to permit the pawl 155 to pivot outwardly in response to belt acceleration as previously described. The shoulder 163 is shown in the blocking position in FIG. 4 and in a release position in FIG. 5. In order to cause the limit shoulder 163 to block the pivoting of the pawl 155 during the initial extension of the belt 101 and thereafter to permit the pivoting of the pawl 155 in response to acceleration thereon, some means must be provided for moving the blocking means 160 correspondingly to the extension of the belt 101.

The improvement, according to this invention for performing this needed function, includes the provision of gearing means 170 associated with the reel 115 and the blocking means 160 for moving the blocking means 160 correspondingly between the blocking and release positions in response to extension of the belt 101 to provide a dead zone for the inertia locking retractor 100. The gearing means 170 includes an integral disc gear 171 on the disc 161 and having a plurality of teeth 172 around the circumference thereof.

The gear means 170 also includes the provision of gear rotating means 175 for rotating the disc gear 171 in response to extension and retraction of the belt 101. The gear rotating means 175 of the retractor 100 includes a centrally located vertically extending brace 176 on the left housing 112 adjacent the cover end thereof. The brace 176 has a tapped hole 177 for receiving a shoulder bolt 178 extending inwardly therefrom and parallel to the axis of the shaft 116. The shoulder bolt 178 acts as an axle to rotatably mount a spur gear set 179. The spur gears of the set 179 include a first gear 180 having teeth 181 and a larger second gear 182 having teeth 183. The teeth 181 of the gear 180 mesh with the teeth 172 of the disc gear 171.

The gear rotating means 175 also include a shaft gear 184 having a central bore 185 which is sized to be pressed onto the stub shaft 124 on the left end 121 of the reel 115 to non-rotatably mount the gear 184 to the reel 115 for rotation therewith. The shaft gear 184 has circumferential teeth 186 which mesh with the teeth 183 of the gear set 179. Thus the shaft gear 184 on the reel shaft 116 meshes with gear 182 of the set 179 which has gear 180 thereof meshing with gear 171 of the disc 161.

One of the meshing gear combinations of the gear means 170 is provided with different numbers of teeth on the same pitch diameter so that upon rotation of the shaft 116, the shaft gear 184 rotates the gear 182 of the set 179 causing the gear 180 to rotate the disc gear 171 a different number of turns and thereby move the disc 161 relative the shaft 116. In the retractor 100, the combination of the shaft gear 184 and the gear 182 of the set 179 meshing therewith, is the selected combination although the combination of the disc gear 171 and the gear 180 of the set 179 meshing therewith could alternatively have been selected. In the retractor 100 the shaft gear 184 has 23 teeth 186 and the gear 182 of the set 179 meshing therewith has 25 teeth 183. The disc gear 171 and the gear 180 of the set 179 meshing therewith each have 24 teeth 172, 181 respectively. Therefore upon clockwise rotation of the reel 215 the approximately 12 turns of the reel 115 which correspond to full extension of the belt 101, the disc 161 will be rotated approximately 11 turns to move the disc 161 almost one full turn counterclockwise relative to the shaft 116 and move the pawl means 145 carried thereby likewise. The relationship between the numbers of teeth on the meshing gear combination and the arcuate length of the shoulder 163 is such that the limit shoulder 163 is maintained in the blocking position of FIG. 4 over the pin 164 during the initial extension of the belt 101 and thereafter the limit shoulder 163 is rotated away from the pin 164 to the release position 164 to permit pivoting of the pawl 155 as has been previously described. Upon rewinding of the belt 101, the gearing means 170 returns the limit shoulder from the release position of FIG. 5 to the blocking position of FIG. 4 ready for extension of the belt 101. Thus the gearing means 170 of the retractor 100 provides a positive and dependable correspondence between the position of the belt 101 and of the blocking means 160.

Once the retractor 100 is assembled as is shown in FIG. 1, a person will pull the belt 101 from its fully retracted position in the retractor 100 to an initial extended position wherein the belt 101 is almost extended enough to be secured to a mating belt (not shown). During this initial extension, and while unwinding the belt 101 against the baising of the retractor spring in the right spring housing 111, the belt reel 115 will rotate the shaft 116 and the shaft gear 184 thereon. The rotation of the shaft gear 184 drives the gear set 179 to rotate the disc gear 171 and the disc 161 relative to the rotating reel 115 and the pawl 155 carried in the channel 146.

The disc 161 is in the position shown in FIG. 4 at full retraction of the belt 101 and upon extension of the belt 101 rotates counterclockwise relative to the reel 115 to move the limit shoulder 163 slowly past the pin 164 until the belt 101 reaches the initial extended position, whereupon the limit shoulder 163 begins to move away from the pin 164. All during the movement of the limit shoulder 163 past the pin 164, the pin 164 upon attempted pivoting of the pawl 155, engages the shoulder 163 to prevent such pivoting of the pawl 155 outwardly from the unlocked position of FIG. 4, regardless of the rate of acceleration that is applied to the belt 101 and to the pawl 155. This the retractor 100 is provided with a dead zone wherein the inertia locking means is prevented from locking.

Once the belt 101 is withdrawn from the retractor 100 past the initial extended position, the limit shoulder 163 is spaced from the pin 164 and the pawl 155 is free to pivot between the unlocked position and the locked position. As long as the wearer of the belt 101 moves slowly, the rate of acceleration on the belt 101 is below the predetermined locking rate of acceleration, and the spring 159 holds the pawl 155 in the unlocked position permitting the reel 115 to rotate and the belt 101 to be extended and retracted.

If the wearer of the belt moves suddenly due to an accident for example, the rate of acceleration on the belt 101 exceeds the locking rate of acceleration and the angular acceleration exerted on the pawl 155 pivots the pawl 155 outwardly against the biasing of the spring 159 into locking engagement with the ratchet 131 to halt the rotation of the reel 115 and the extension of the belt 101 as required to restrain the wearer against further movement.

Upon cessation of the sudden movement, the retractor spring unlocks the pawl 155 from the ratchet 131 permitting the spring 159 to return the pawl 155 to the unlocked position. The belt 101 is now free to be extended or retracted as desired.

Upon retraction of the belt 101, the rotation of the reel 115 due to the retraction spring, rotates shaft gear 184 to drive the gear set 179 and rotate the disc gear 171 and the disc 161 clockwise relative the reel 115. The clockwise rotation of the disc moves the limit shoulder 163 from the release position of FIG. 5 over the pin 164 to the position shown in FIG. 4 wherein the shoulder 163 again may be engaged by the pin 164. The shoulder 163 remains in the position shown in FIG. 4 until the belt 101 is extended from the retractor 100 again Referring now to FIGS. 6 through 10 and particularly to FIG. 7, the retractor 200 has a frame 205. The frame 205 has upstanding side walls 206 with an aligned central hole 207 and peripheral mounting holes 208, a web 209 between the side walls 206 mounting holes 210 in the web 209, a right spring housing 211, and a left spring housing 212.

The reel 215 of the retractor 200 for having one end of the safety belt 201 secured thereto includes a shaft 216 with a central portion extending through the aligned central holes 207 of the upstanding side walls 206 to be rotatably mounted therein. The reel 215 also includes a sleeve 217 around the shaft 216 and between the side walls 206. The sleeve 217 has a longitudinal slot 218 and oppositely extending end tabs 219. The reel 215 has a pair of circular end plates 220 with a central hole 221 around the shaft 216. The plates 220 have a plurality of equally spaced slots receiving the tabs 219 of the sleeve 217. The looped end of the belt 201 extends through the slot 218 in the sleeve 217 and around the shaft 216 to be mounted to the reel 215. A bifurcated spring 222 has a pin end 223 extending into a hole in the left disc 220 and the bifurcated ends extend into opposite slots 224 in the shaft 216 to lock the sleeve 217 and end plates 220 to the shaft 216 in the frame 205. The shaft 216 has a horizontal slot 225 on the right end 226. The shaft 216 has a flat 227 followed by an axially protruding stub shaft 228 on the left end 229, protruding from the left side wall 206.

The inertia locking means 230 of the retractor 200 includes a lock bar 231, a sleeve ratchet 240, a pawl means 245 having a pawl mounting plate 246 and a pawl 255.

The lock bar 231 of the inertia locking means 230 of the retractor 200 extends through a pair of triangular slots 232 in the lower rear corner of the upstanding side walls 206 of the frame 205. The lock bar 231 has a spaced pair of teeth 233 which in a pivoted forward or locked position of the lock bar 231 (see FIG. 10) lockingly engage teeth 234 on the plates 220 to halt clockwise rotation of the reel 215 and which in a pivoted rearward or unlocked position of the lock bar 231 (see FIGS. 8 and 9) are spaced from the teeth 234 to permit rotation of the reel 215 in either direction.

The lock bar 231 has a hole 235 on the left end thereof for receiving one end of a torsion spring 236, the other end of which is hooked into hole 237 in the left upstanding side wall 206 to bias the lock bar to the unlocked position. The left end of the lock bar 231 has a lever arm 238 extending toward the left end 229 of the shaft 216.

Figure 9:
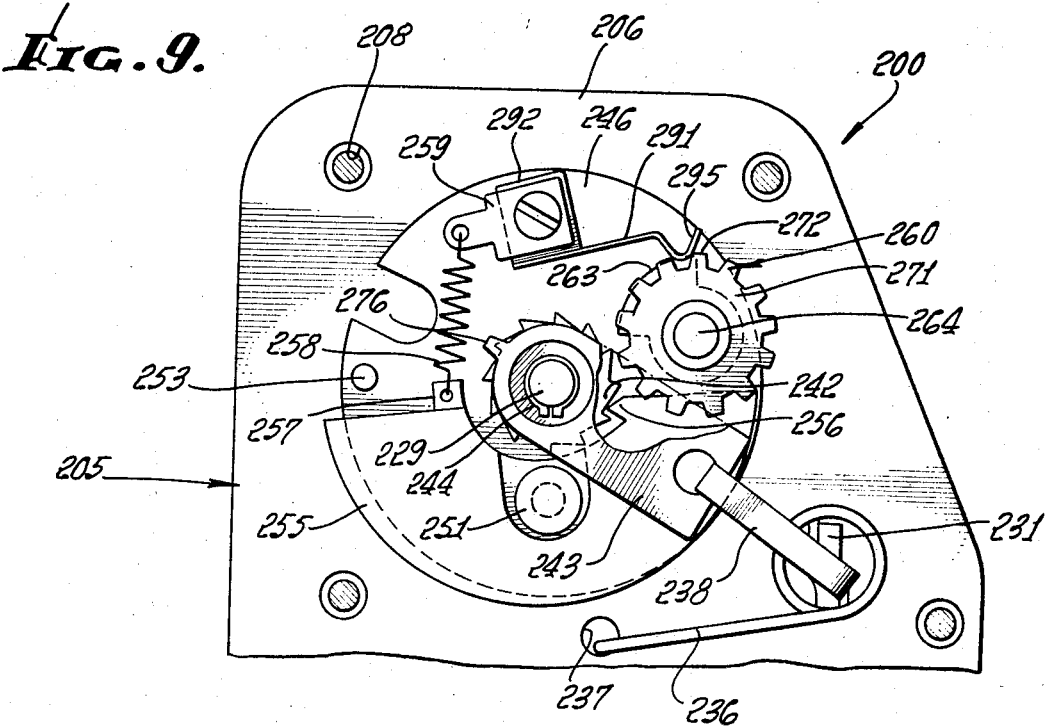
FIG. 9 is a view similar to FIG. 8 but showing the limit shoulder rotated away from the pawl to release the inertia locking means and showing the pawl locking onto the toothed sleeve.
Figure 10:
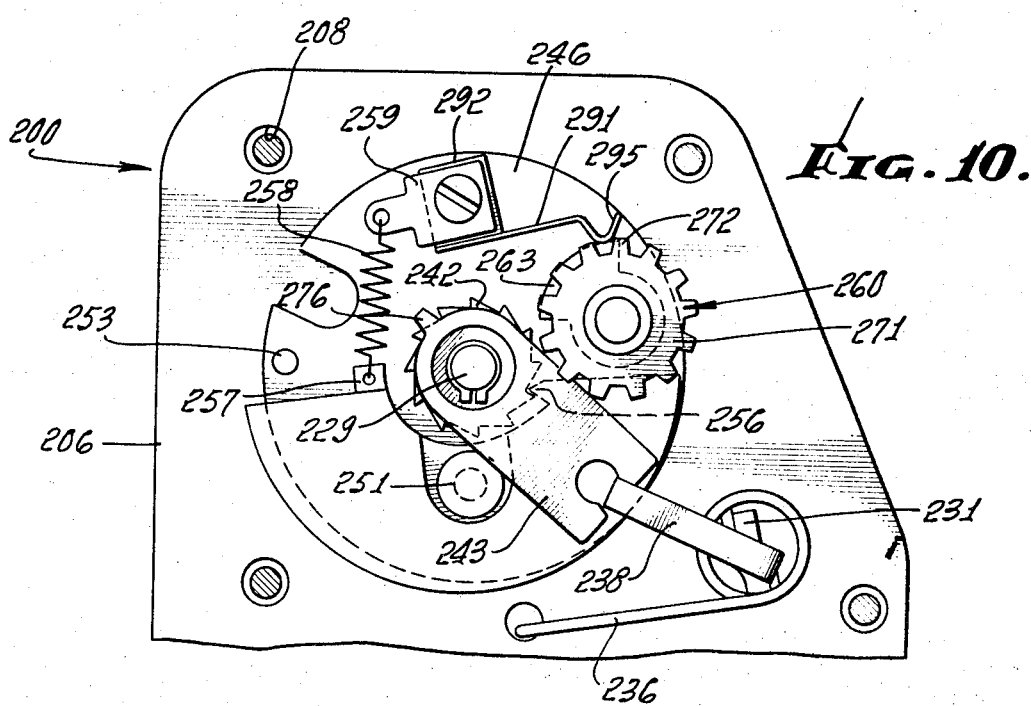
FIG. 10 is a view similar to FIG. 9 but showing the toothed sleeve with the pawl locked thereto, rotated to move the locking bar into the teeth of the reel and lock the reel and the belt wound thereon against further extensive movement.

The sleeve ratchet 240 of the inertia locking means 230 of the retractor 200 has a central bore 241 sized to be rotatingly received on the stub shaft 228 on the left end 229 of the shaft 216. The sleeve ratchet 240 has peripheral teeth 242 for a purpose which will appear later and a bifurcated lever arm 243 extending around the end of lever arm 238, as best seen in FIGS. 8, 9, and 10. The lever arm 243 operably connects the sleeve 240 to the lock bar 231 so that rotation of the sleeve ratchet 240 will pivot the lock bar 231 as seen by comparing FIGS. 9 and 10. A snap ring 244 axially restrains the sleeve ratchet 240 on the stub shaft 228.

The pawl means 245 of the inertia locking means 230 has a pawl mounting plate 246 with a flatted central aperture 247 sized to mate with the flat 227 for sliding over the left end 229 of the shaft 216 before the sleeve ratchet 240 is slid onto the stub shaft 228. The plate 246 has a cutout which when aligned with the arm 238 permits the plate 246 to slide onto the left end 229 of the shaft 216 past the arm 238 to be non-rotatably mounted to the shaft 216 by the mating of flat 227 with aperture 247 for rotation therewith. The plate 246 has a raised boss 248 on the lower half thereof. The raised boss 248 has a central hole 249 for receiving the end of a shoulder pin 250 having a head 251 on the opposite end thereof. A semicircular pawl 255 is pivotally mounted by the shoulder pin 250 on the boss 248. The pawl 255 has a radially inwardly extending internal tooth 256, and a spring tab 257. One end of a spring 258 is hooked in the tab 257 and the other end of which is hooked to a spring anchor 259 to bias the pawl 255 clock-wise against a stop pin 253 extending from the plate 246.

Upon rotation of the reel 215 and the shaft 216 due to extension of the belt 201, the plate 246 rotates. If the belt 201 is withdrawn with a sufficient acceleration, i.e. at a rate of acceleration above the predetermined locking rate of acceleration, the pawl 255 due to its inertia will lag behind the angular acceleration of the plate 246 and effectively pivot, as seen by comparison of FIGS. 8 and 9, counterclockwise until the tooth 256 thereof engages the teeth 242 of the sleeve 240 to rotate the sleeve 240 therewith, as seen by comparing FIGS. 9 and 10. The pawl 255 is balanced radially about its pivot axis to prevent any centrifugal force due to its being rotated from acting on the pawl 255. The rotation of the sleeve 240 pivots the lock bar 231, through the engagement of the lever arm 243 with the lever arm 238 from the unlocked position of FIG. 9 to the locked position of FIG. 10 wherein the teeth 233 of the lock bar 231 engages the teeth 234 of the reel 215 to halt rotation thereof and thereby halt the extension of the belt 201. Upon release of the belt 201, the retractor spring rotates the reel 215 counterclockwise to release the lock bar 231 and permits the spring 236 to pivot the lock bar 231 from the locked position of FIG. 10 to the unlocked position of FIG. 9 and to pivot the sleeve 240 on the shaft 216. In the meantime, the spring 258 has pivoted the pawl 255 clockwise from the locked position of FIGS. 9 and 10 to the unlocked position of FIG. 8. The above described action would occur during the initial extension of the belt 201 from the retractor 200 except that the blocking means 260 are provided.

The blocking means 260 of the retractor 200 includes a disc 261 having a central bore 262 and an arcuate limit shoulder 263. The arcuate limit shoulder 263 extends through an arc of approximately 120°. A shoulder pin 264 rotatably mounts the disc 261 to the pawl mounting plate 246 by threading into hole 265. The disc 261 is so located that in certain rotative positions, such as is shown in FIG. 8, the shoulder 263 engages the pawl 255 to prevent counterclockwise pivoting thereof and in other rotative positions thereof the shoulder 263 is spaced from the pawl 255 to permit counterclockwise rotation thereof from unlocked to locked positions. The shoulder 263 is shown in the blocking position in FIG. 8 and in the release position in FIGS. 9 and 10.

Again in order to cause the limit shoulder 263 to block the pivoting of the pawl 255 during the initial extension of the belt 201 and thereafter to permit the pivoting of the pawl 255 in response to acceleration thereon, gearing means 270, according to this invention, are provided. The gearing means 270 of the retractor 200 includes the provision of a disc gear 271 on the disc 261. The disc gear 271 has external teeth 272.

The gearing means 270 also includes gear rotating means 275 which for the retractor 200 is a single radially outwardly extending external tooth 276 on the sleeve 240. The tooth 276 on the sleeve 240 is aligned with the teeth 272 on the disc gear 271 so that each time the disc gear 271 is rotated by the mounting plate 246 past the tooth 276, the engagement between the teeth 276 and 272 rotates the disc 271 an incremental amount. Repeated incremental amounts of rotation of the disc 261 moves the shoulder 263 thereon from the blocking to the release positions in correspondence with extension of the belt 201.

In order to prevent the disc 261 and the shoulder 263 carried thereby from rotating except in response to movement past the tooth 276, retainer means 290 may be provided for releasably holding the disc gear 271. The retainer means 290 of the retractor 200 includes a spring 291 having a flange 292 pinned at 293 to an upper boss 294 on the plate 246. The pin 293 also secures the spring anchor 259 to the plate 246. The outer end 295 of the spring 291 is U-shaped to sit in the space between the teeth 272 of the disc gear 271 and thereby prevent it from rotating except when passing the single tooth 276 on the sleeve 240. When the disc gear 271 is rotated past the single tooth 276 by the rotation of shaft 216 and the mounting plate 246 thereon, the engagement of the teeth 272 with the single tooth 276 deforms the spring 291 to jump the outer end 295 thereof to the next space between the teeth 272. The spring 291 remains so located until the disc gear 271 again passes the single tooth 276 to again jump the outer end 295 and so on.

Figure 6:
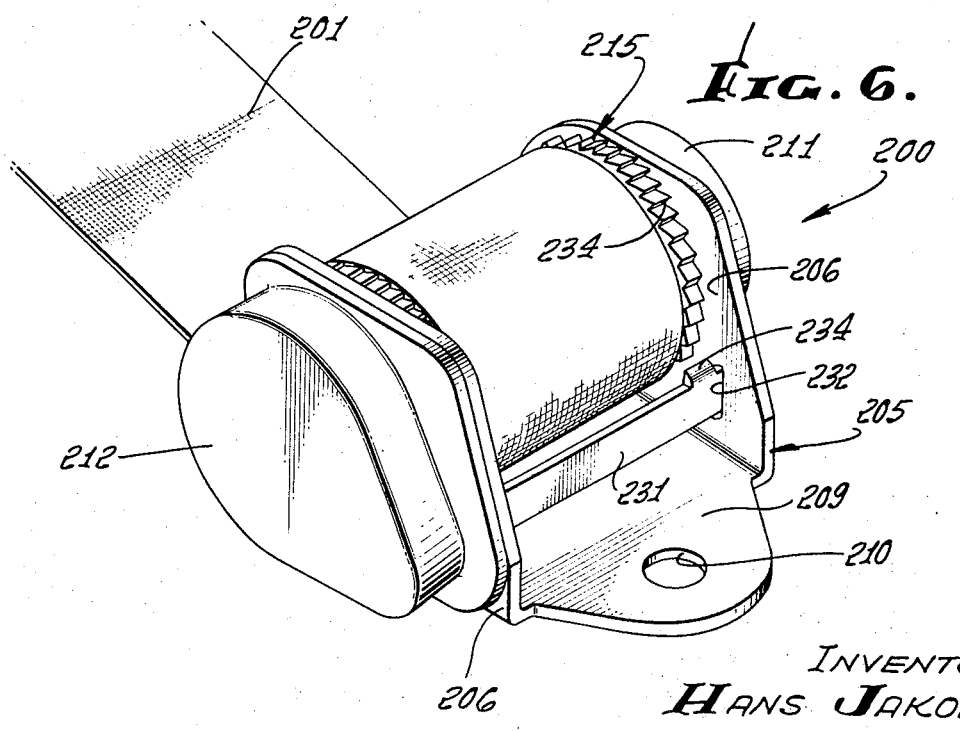
FIG. 6 is a perspective view similar to FIG. 1, but showing an inertia locking retractor having the alternative preferred embodiment of the improved dead zone mechanism according to this invention.

Once the retractor 200 is assembled, as is shown in FIG. 6, a person will pull the belt 201 from its fully retracted position in the retractor 200 to an initial extended position wherein the belt 201 is extended almost enough to be secured to a mating belt (not shown). During this initial extension, and while unwinding the belt 201 against the biasing of the retractor spring in the right housing 211, the belt reel 215 will rotate the shaft 216 and the pawl mounting plate 246 thereon, to rotate the disc gear 271 past the single tooth 276 on the stationary sleeve 240, thereby rotating the disc 261 and the shoulder 263 thereon relative to the pawl 255.

The disc 261 is the position shown in FIG. 8 upon full retraction of the belt 201, and upon extension of the belt 201, rotates clockwise past the single tooth 276 to be incrementally rotated thereby, clockwise relative the pawl 255 to move the limit shoulder 263 past the pawl 255 and to jump the end 295 of spring 291 from space to space between teeth 272 of the disc gear 271 until the belt 201 reaches the initial extended position after which the limit shoulder moves clockwise away from the pawl 255. All during the movement of the limit shoulder 263 past the pawl 255, the engagement of the pawl 255 with the limit shoulder 263 will prevent the pivoting of the pawl counterclockwise from the unlocked position of FIG. 8, regardless of the rate of acceleration applied to the belt 201 and the pawl 255.

Once the belt 201 is withdrawn from the retractor 201 past the initial extended position, the limit shoulder 263 is spaced from the pawl 255 as the disc 261 is moved incrementally in the clockwise direction, and the pawl 255 is free to pivot from the unlocked position to the locked position. As long as the wearer of the belt 201 moves slowly, the rate of acceleration on the belt 201 is below the predetermined locking rate of acceleration and the spring 258 holds the pawl 255 in the unlocked position and the spring 236 holds the lock bar 231 in the unlocked position, permitting the reel 215 to rotate and the belt 201 to be extended.

If the wearer of the belt 201 moves suddenly due to an accident for example, the rate of acceleration on the belt 201 exceeds the predetermined locking rate of acceleration, and the effective angular acceleration on the pawl 255 effectively pivots the pawl 255 counterclockwise against the biasing of spring 258 into locking engagement with the sleeve ratchet 241 to in turn pivot the sleeve ratchet 241 clockwise on the stub shaft 228. The clockwise pivoting of the sleeve ratchet 241 pivots the locking bar against the biasing of spring 236 from the unlocked position of FIG. 9 to the locked position of FIG. 10 wherein the teeth 233 engage the teeth 234 on the reel 215 to halt the rotation of the reel 215 and the extension of the belt 201.

Upon cessation of the sudden movement, the retractor spring rotates the reel 215 counterclockwise slightly, unlocking the teeth 234 from the teeth 233 and the tooth 256 from the teeth 242. Thereupon the spring 236 returns the lock bar 231 and the sleeve ratchet 240 to the unlocked position and the spring 258 pivots the pawl 255 clockwise to the unlocked position. The belt 201 is now free to be extended or retracted as desired.

Upon retraction of the belt 201, the rotation of the reel 215 due to the retractor spring rotates the shaft 216 and the mounting plate 246 carried thereby counterclockwise to move the disc gear 271 counterclockwise past the stationary tooth 276 on the sleeve ratchet 240 to be incrementally rotated thereby. This incremental rotation moves disc 261 and the limit shoulder 263 carried thereby from the release position of FIGS. 9 and 10, past the pawl 255 to the blocking position shown in FIG. 8 wherein the pawl 255 may again engage the limit shoulder 263. This incremental rotation also jumps the end 295 of the spring 291 from space to space between teeth 272 of the disc gear 271. The limit shoulder 263 is held in the position shown in FIG. 8 by the spring 291 until the belt is again extended from the retracted position.

In the retractor 200, the single tooth 276 was located on the sleeve 240 which is stationary relative to the frame 205 except upon locking, but the tooth 276 could have alternatively been located on the frame 205 itself. With such a location the gearing means 270 would still operate, though the change in position of the tooth 276 might require a change in the positioning of the limit shoulder 263.

While the retractors 100 and 200 have two different reels, inertia locking means, and blocking means, yet the gearing means, according to this invention, is adaptable to operate the blocking means in correspondence with the extension of the belt for both of these constructions. The retractors 100 and 200 are but two of many possible designs which have been successfully used for inertia locking retractors. The gearing means improvement may need to be slightly modified to be adapted to operate the blocking means of other inertia locking retractor designs, but the gearing means is easily adaptable by a person skilled in the art as needed. Such adaptations are certainly within the scope of this invention and the claims which follow.

I claim:
1. In an inertia locking retractor having an associated dead zone mechanism for permitting an initial extension of a safety belt at a rate of acceleration above a predetermined locking rate of acceleration, said retractor including:
a frame,
a belt reel rotatably mounted by an associated shaft to the frame, said belt reel having one end of the safety belt secured thereto,
means for biasing the reel for rotation to a retracted position wherein the belt is wound around the reel, extension of the belt rotating the reel against such biasing, and
inertia locking means including an inertia member eccentrically mounted to and rotated by a shaft associated with said belt reel for locking the reel against rotation upon application of a rate of acceleration to the belt which is above the predetermined locking rate, said locking means inertia member being moved from unlocking to locking positions due to such acceleration, the improvement comprising the provision of:
blocking means for selectively blocking the locking means inertia member in the unlocking position, said blocking means being movable between an inertia member blocking position and a release position,
gearing means associated with said reel and said blocking means for moving the blocking means correspondingly between the blocking position and the release position in response to extension of the belt to provide a dead zone for inertia locking means of the inertia safety belt retractor, said gearing means including a first toothed gear member associated with said blocking means to rotate the latter between said blocking and release positions upon rotation of said first gear member and a second gear member having at least one tooth for meshing with and rotating said first gear member in response to rotation of said reel during extension and retraction of said safety belt.

2. In an inertia locking retractor having an associated dead zone mechanism for permitting an initial extension of a safety belt at a rate of acceleration above a predetermined locking rate of acceleration, said retractor including:
a frame,
a belt reel rotatably mounted by an associated shaft to the frame, said belt reel having one end of the safety belt secured thereto,
means for biasing the reel for rotation to a retracted position wherein the belt is wound around the reel, extension of the belt rotating the reel against such biasing,
inertia locking means for locking the reel against rotation upon application of a rate of acceleration to the belt which is above the predetermined locking rate, said locking means being moved from unlocked to locked positions due to such acceleration, and
blocking means for selectively holding the locking means in the unlocked position, said blocking means being movable between a blocking position and a release position, the improvement comprising the provision of,
gearing means associated with said reel and said blocking means for moving the blocking means correspondingly between the blocking position and the release position in response to extension of the belt to provide the dead zone for the inertia safety belt retractor, wherein the blocking means includes a disc rotatably mounted relative the locking means and mounted for rotation with the belt reel relative to the frame, said disc having a limit shoulder being adapted to engage the inertia locking means in certain rotative positions of the disc while being adapted to permit movement of the inertia locking means between its unlocked and locked positions in other rotative positions of the disc, and
wherein the gearing means includes a disc gear nonrotatively connected to the disc to rotate the disc in response to rotation of the gear, a tooth associated with the frame for engagement by the rotated disc gear and a spring mounted to the reel and engaging the disc gear to hold the disc gear from rotation relative the locking means except when the disc gear, rotating with the belt reel, engages the tooth and overcomes the biasing of the spring whereby rotation of the belt reel rotates the disc gear therewith past the tooth on the frame to rotate the disc relative to the inertia locking means and move the disc between its rotative positions.

3. The improvement as in claim 1
wherein the blocking means includes a disc rotatably mounted relative the locking means and mounted for rotation with the belt reel relative to the frame, said disc having a limit shoulder being adapted to engage the inertia locking means in certain rotative positions of the disc while being adapted to permit movement of the inertia locking means between its unlocked and locked positions in other rotative positions of the disc, and
wherein the gearing means includes a disc gear nonrotatively connected to the disc to rotate the disc in response to rotation of the gear, a tooth associated with the frame for engagement by and a spring mounted to the reel and engaging the disc gear to hold the disc gear from rotation relative the locking means except when the disc gear, rotating with the belt reel, engages the tooth and overcomes the biasing of the spring whereby rotation of the belt reel rotates the disc gear therewith past the tooth on the frame to rotate the disc relative to the inertia locking means and move the disc between its rotative positions.

4. In an inertia locking retractor having an associated dead zone mechanism for permitting an initial extension of the safety belt at a rate of acceleration above a predetermined locking rate of acceleration, said retractor including a frame, a belt reel mounting a safety belt and rotatably mounted to the frame, an inertia locking means including an inertia member for locking the reel, the improvement comprising the provision of: inertia member blocking means movable between a release position and a blocking position for blocking movement of the inertia member of said locking means and
gearing means associated with said reel and said inertia member blocking means for moving the blocking means correspondingly between the blocking position and the release position in response to extension of the belt to provide the dead zone for the inertia locking retractor, said gearing means including a first gear member having gear teeth thereon and being associated with said blocking means to produce said moving of said blocking means upon rotation of said gear member and a second gear member having at least one gear tooth thereon for meshing with and rotating said first gear member upon rotation of said reel.

5. In an inertia locking retractor having an associated dead zone mechanism for permitting an initial extension of the safety belt at a rate of acceleration above a predetermined locking rate of acceleration, said retractor including a frame, a belt reel mounting a safety belt and rotatably mounted to the frame, inertia locking means for locking the reel and blocking means movable between a release position and a blocking position for holding the inertia locking means from locking, the improvement comprising the provision of:

gearing means associated with said reel and said blocking means for moving the blocking means correspondingly between the blocking position and the release position in response to extension of the belt to provide the dead zone for the inertia locking retractor, wherein the blocking means includes a disc rotatably mounted relative to the locking means, said disc having a limit shoulder adapted to restrain operation of the inertia locking means in certain rotative positions of the disc, holding the inertia locking means in the unlocked position, while being adapted to permit movement of the inertia locking means between unlocked position and locked positions in other rotative positions of the disc, and wherein the gearing means includes a disc gear non-rotatively connected to the disc to rotate the disc in response to rotation of the disc gear, and includes gear rotating means for rotating the disc gear in response to the extension and retraction of the belt.

6. The improvement as in claim 5 wherein the gear rotating means includes:
a shaft gear non-rotatably mounted to a reel associated shaft for rotation therewith in response to extension and retraction of the belt,
a gear set rotatively associated with the frame, said gear set including two gears non-rotatably connected together whereby rotation of one gear rotates the other gear, one of said gears being operably connected to the shaft gear and the other of said gears being operably connected to the disc gear, one pair of such operably connected gears having different numbers of teeth whereby rotation of the shaft rotates the shaft gear which rotates the gear set to rotate the disc gear and the disc thereon between its rotative positions.

7. The improvement as in claim 5 wherein the disc is mounted for rotation with the belt reel relative to the frame, and
wherein the gear rotating means includes a tooth associated with the frame for engagement with the disc gear as the disc gear rotates with the belt reel, whereby extension of the belt rotates the disc gear past the tooth to rotate the disc relative to the inertia locking means and moves the disc between its rotative positions.

8. The improvement as in claim 7 additionally comprising a spring associated with the reel and extending to the disc gear to hold the disc gear from rotating relative to the inertia locking means except when the disc gear, rotating with the reel, engages the tooth to overcome the action of the spring and rotate the disc gear to a new rotation position relative the inertia locking means whereupon the spring holds the disc gear in the new rotative position until the disc gear engages the tooth.

9. The improvement as in claim 5 additionally comprising:
retainer means for releasably holding the disc gear from rotating except when it is rotated by the gear rotating means.

10. The improvement as in claim 9 wherein the retainer means includes a spring having one end associated with the reel and the other end engaging the disc gear to hold the disc gear from rotation relative to the locking means, the gear rotating means overcoming the action of the spring to rotate the disc gear to a new position wherein the action of the spring holds the disc gear until rotated again by the gear rotating means.

11. The improvement in an inertia locking retractor as in claim 4, wherein said second gear member is non-rotatively mounted to a reel associated shaft for rotation therewith in response to the extension and retraction of the belt, and
wherein one or more additional gear members are provided in gear chain-like fashion between said first and second gear members for imparting rotation to said first gear member in response to rotation of said second gear member.

12. The improvement in an inertia locking retractor as in claim 4, wherein said second gear member is mounted to said frame and said first gear member is mounted to said reel to revolve about said second gear member.

* * * * *